United States Patent [19]

Hashimoto et al.

[11] 4,364,081
[45] Dec. 14, 1982

[54] METHOD AND APPARATUS FOR PROCESSING A DIGITAL COLOR VIDEO SIGNAL

[75] Inventors: Yoshitaka Hashimoto, Chofu; Norihisa Shirota, Atsugi; Kaichi Yamamoto, Zama, all of Japan

[73] Assignee: Sony Corporation, Tokyo, Japan

[21] Appl. No.: 254,851

[22] Filed: Apr. 16, 1981

[30] Foreign Application Priority Data

Apr. 16, 1980 [JP] Japan .................................. 55-50887
Apr. 29, 1980 [JP] Japan .................................. 55-56882

[51] Int. Cl.³ ............................................. H04N 9/00
[52] U.S. Cl. .................................... 358/13; 358/327; 371/30
[58] Field of Search ................... 358/8, 13, 36, 37, 17, 358/36; 340/347 M; 371/2, 30, 37, 36; 375/26, 34

[56] References Cited

U.S. PATENT DOCUMENTS 4,081,826  3/1978  Ninomiya ................................ 358/8
4,106,053  8/1978  Maxemchuk .......................... 358/13

*Primary Examiner*—Robert L. Richardson
*Attorney, Agent, or Firm*—Lewis H. Eslinger; Alvin Sinderbrand

[57] ABSTRACT

A method for processing a digital color video signal formed of 8-bit words, includes the recording steps of converting each 8-bit word into a 10-bit word in accordance with a predetermined mapping function, grouping the 10-bit words into 48 word blocks, adding to each block an identification signal, identification signal check words $P_1$ and $Q_1$, and data check words $P_2$ and $Q_2$, the latter being formed by the equations:

$$\begin{cases} Q = T^{-1}W_n + T^{-2}W_{n-1} + \ldots + T^{-(n-1)}W_2 + T^{-n}W_1 \\ P = T^1W_n + T^2W_{n-1} + \ldots + T^{n-1}W_2 + T^nW_1 \end{cases}$$

where $T^{-1}, T^{-2}, \ldots T^{-(n-1)}, T^{-n}, T^1, T^2, \ldots T^{n-1}, T^n$ are distinct, non-zero elements of a Galois field ($2^m$); and includes the reproducing steps of reconverting each of the 10-bit words to its corresponding 8-bit word in accordance with the predetermined mapping function with the reconverted 8-bit words forming a data unit for each 12 words thereof and a data block for each 48 words thereof, detecting whether any of the 8-bit words contain an error by failing to satisfy the mapping function reconversion, determining that each data unit that includes an 8-bit word having an error is erroneous, detecting and correcting any errors in the identification signals by means of the identification signal check words $P_1$ and $Q_1$, determining whether each erroneous data block and data unit is capable of being corrected and concealing each erroneous data unit that is determined to be uncorrectable and correcting errors in the 8-bit words in each erroneous data block and data unit that is determined to be correctable, by means of the data check words $P_2$ and $Q_2$ and parity words, respectively, thereby forming a continuous, composite digital color video signal, and correcting the phase of the color sub-carrier of each data unit of the composite digital color video signal by comparison of a reference signal with the identification signal of the block to which each respective data unit belongs.

31 Claims, 14 Drawing Figures

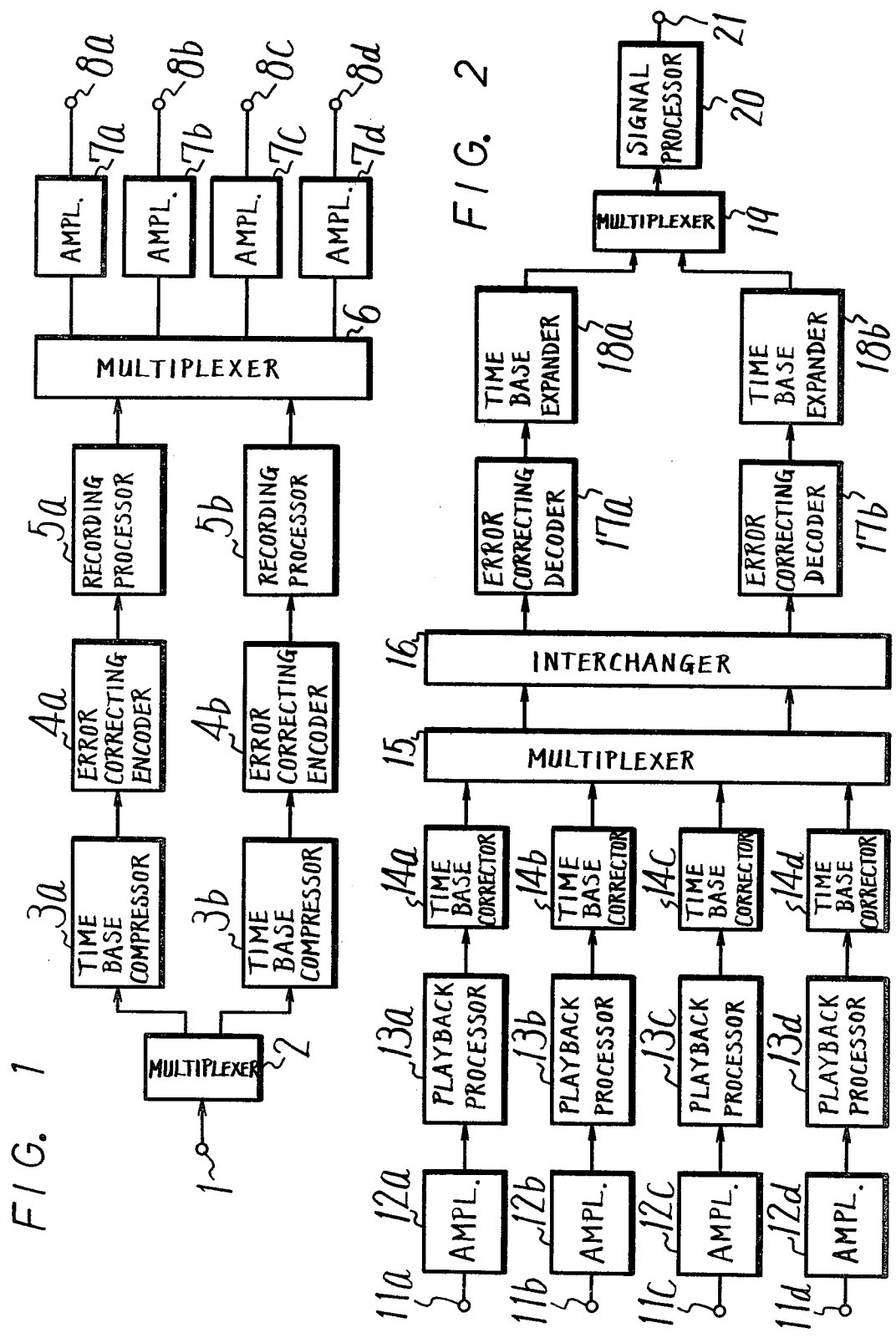

FIG. 6

METHOD AND APPARATUS FOR PROCESSING A DIGITAL COLOR VIDEO SIGNAL

BACKGROUND OF THE INVENTION

This invention relates to a method and apparatus for processing digital signals and, more particularly, is directed to a method and apparatus for detecting and correcting errors in digital signals which are recorded and reproduced with a digital video tape recorder.

Recently, digital techniques have been used for the transmission and recording of video signals. In particular, a rotary head type video tape recorder (VTR) has been used to record pulse code modulated (PCM) video signals on a magnetic tape and, upon reproduction by the rotary head, the video signals are pulse code demodulated. In such case, the digital video signals are generally grouped into blocks with each block containing a predetermined number of bits. Upon reproduction, each block of the reproduced digital video signals is processed.

However, when a PCM-encoded video signal is recorded and subsequently produced, there is the possibility that the reproduced video signals may contain random errors caused by various types of noise, such as head noise, tape noise and amplifier noise, and burst errors (signal drop-out) resulting from dust or flaws on the tape surface. It should be appreciated, of course, that such errors may seriously deteriorate the quality of the video reproduction. In order to minimize this problem, error correction codes have been used in encoding the PCM signals prior to recording on the tape. For example, parity words may be added every predetermined number of blocks of video data and such parity words are then used during reproduction in an error detection operation. By using such error correction codes, erroneous PCM signals which are reproduced may be corrected or compensated so as to avoid the aforementioned deterioration in video reproduction. It should be appreciated that the more error correction code words that are used, the more accurate is the error detection/correction operation. However, it is also desirable, in achieving such error correction, to reduce the redundancy or number of error correction bits as much as possible so as to increase the area of tape that can be used for recording of data.

Further, when the number of errors becomes too high, so as to exceed the error correcting capability of the error correction code, an error concealment operation, rather than an error correction operation, is used. For example, the error concealment operation may be accomplished by replacing the erroneous video data with video data which is approximately equal thereto. In this regard, a field memory for storing successive fields of video data is provided and an address signal is added to each block of video data for addressing the blocks of video data into the field memory. When the speed of movement of the magnetic tape during reproduction is faster than that during recording, the rotary head is shifted so as to skip over a predetermined number of tracks to reproduce, for example, every other track. During reproduction at a speed slower than that of recording, the rotary head scans the same track more than once and then jumps over to the next adjacent track. As a result, the reproduced video data is not of a continuous nature. In this regard, the address signals of the reproduced video data are used to write the video information into the field memory at predetermined addresses so as to obtain a picture having continuity.

When the aforementioned error concealment operation is utilized with a digital color video signal, the phase of the color sub-carrier may be inverted at the connection point between the original erroneous video data and the substituted video data. More particularly, in the case of an NTSC system, the phase of the color sub-carrier between corresponding portions of successive frames differs by $\pi/2$. It should therefore be appreciated that when video data from one frame is substituted for corresponding video information of a successive frame, the phase of the color sub-carrier of the substituted video information must be inverted to provide a continuous phase relation of the sub-carrier. This is explained more fully in U.S. Patent Application Ser. No. 06/194,830, filed Oct. 7, 1980, having a common assignee herewith. In this regard, it has been proposed to add an identification signal to the video data for indicating the frame, field and line to which the video information belongs. However, if an error results in the identification signal, such phase inversion cannot readily be performed.

Further, to more accurately correct any error caused by drop-out, it has been proposed to add still another error correction code to the video data signal to more accurately detect and correct any error produced in each block of video data. In such case, it is desirable to use a code having a high capability of error detection and correction while, at the same time, having a low redundancy.

OBJECTS AND SUMMARY OF THE INVENTION

Accordingly, it is an object of this invention to provide a method and apparatus for processing a digital signal that avoids the above-described difficulties encountered with the prior art.

More particularly, it is an object of this invention to provide a method and apparatus for processing a digital video signal which is particularly adapted to accurately detect and correct errors in the video signal without increasing the redundancy thereof.

It is another object of this invention to provide a method and apparatus for processing a digital video signal which accurately conceals errors during special reproducing modes of the digital VTR.

It is still another object of this invention to provide a method and apparatus for processing a digital signal which has a higher error detecting capability than that of the prior art.

In accordance with an aspect of this invention, a method of processing a digital signal comprised of a plurality of N-bit words which have been code converted from a plurality of M-bit words in accordance with a predetermined mapping function, includes the steps of reconverting each of the N-bit words to a respective one of the M-bit words in accordance with the mapping function, with the plurality of reconverted M-bit words forming a data unit for every predetermined number of words thereof; detecting whether any of the M-bit words contain an error by failing to satisfy the mapping function during the step of reconverting; and determining that each data unit that includes an M-bit word having an error is erroneous.

In accordance with another aspect of this invention, a method of processing a digital signal includes the steps of sampling an analog signal at a predetermined frequency; converting the sampled signal into digitized form; forming a data block for every predetermined number of bits of the digital signal; adding an identification signal to each data block for identification thereof; and adding an error correcting signal to each of the identification signals.

In accordance with still another aspect of this invention, a method of processing a digital signal includes the steps of sampling an analog signal at a predetermined frequency; converting the sampled signal into digitized form; forming a data word every m bits; and adding two check words P and Q to every n data words, each check word having m bits and the check words being formed by the equations:

$$\begin{cases} Q = T^{-1}W_n + T^{-2}W_{n-1} + \ldots + T^{-(n-1)}W_2 + T^{-n}W_1 \\ P = T^1W_n + T^2W_{n-1} + \ldots + T^{n-1}W_2 + T^nW_1 \end{cases}$$

where $T^{-1}, T^{-2}, -T^{-(n-1)}, T^{-n}, T^1, T^2, -, T^{n-1}, T^n$ are distinct, non-zero elements of a Galois field ($2^m$).

In addition, apparatus according to this invention are provided for practicing the above-described methods.

The above, and other, objects, features and advantages of the invention, will be apparent in the following detailed description of illustrative embodiments of the invention which is to be read in connection with the accompanying drawings.

BRIEF DESCRIPTION OF THE DRAWINGS

FIG. 1 is a block diagram illustrating a recording section of a digital video tape recorder (VTR) embodying this invention;

FIG. 2 is a block diagram illustrating a reproducing section of a digital video tape recorder (VTR) embodying this invention;

FIG. 6 is a schematic diagram to which reference will be made in explaining the digitization and code arrangement of a video signal for use in a digital VTR embodying this invention;

DETAILED DESCRIPTION OF THE PREFERRED EMBODIMENTS

In order to facilitate a better understanding of the present invention, there will first be described the conditions for digital recording of an NTSC color video signal. In particular, since one frame comprises 525 lines, the number of lines selected for a first (third) and a second (fourth) field are 262 and 263, respectively. In the first field, a vertical synchronizing pulse and a horizontal synchronizing pulse are in phase with each other, and the field in which they are out of phase is considered the second field.

Figure 3A:
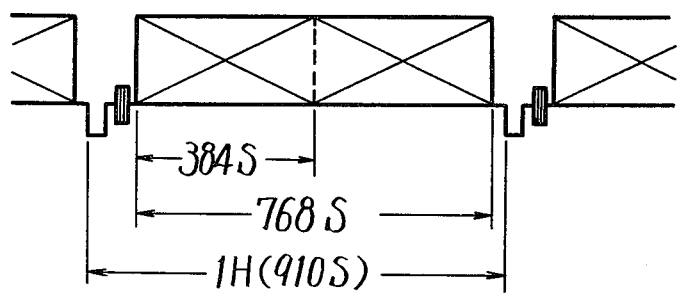
FIGS. 3A and 3B are schematic diagrams to which reference will be made in explaining the digitization and code arrangement of a video signal for use in a digital VTR embodying this invention.

Further, the number of sampled picture elements in each horizontal period (H) varies with the sampling frequency ($f_S$) employed. Since the color sub-carrier frequency ($f_{SC}$) is 455/2 times the horizontal frequency ($f_H$), the number of sampled picture elements in one horizontal period for a sampling frequency $f_S = 4f_{SC}$ is 910 samples (FIG. 3A). Further, the number of samples in the effect video region or portion of each horizontal period is 768, with the remaining portion of each horizontal period constituting the horizontal blanking interval which includes a horizontal synchronizing signal and a burst signal.

Figure 4:
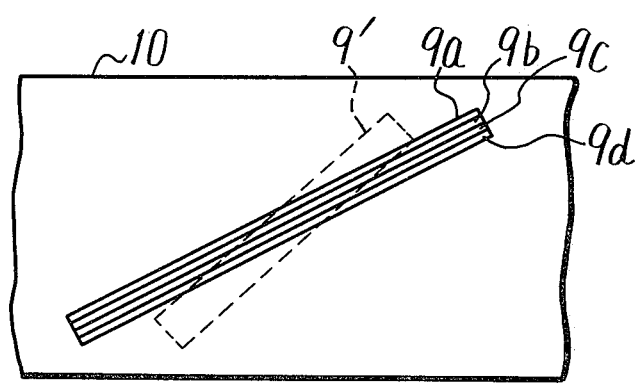
FIG. 4 is a schematic plan view illustrating a track pattern recorded with the recording section of FIG. 1.

Referring now to the drawings in detail, and initially to FIG. 1 thereof, there is shown a recording section of a digital VTR according to this invention having an input terminal 1 to which an NTSC color video signal to be recorded is applied. The color video signal from input terminal 1 is supplied to a multiplexer 2 in which the digitized effective region of the color video signal in each half horizontal period (½H) is divided into two channels. The data of the two channels are processed in the same manner. The data in one of the channels is derived as a record signal after being applied, in sequence, to a time base compression circuit 3a, an error correcting encoder 4a, a recording processor 5a, a multiplexer 6 and recording amplifiers 7a and 7b. The data in the other channel is also processed by the same arrangement, that is, by a time base compression circuit 3b, an error correcting encoder 4b, a recording processor 5b, multiplexer 6 and recording amplifiers 7c and 7d. The output signals from amplifiers 7a–7d are supplied through output terminals 8a–8d to respective four rotary heads (not shown) extending obliquely on a magnetic tape 10, as shown in FIG. 4. It should be appreciated that each scanning operation by the four rotary heads results in one field of video information being recorded in the four parallel tracks 9a–9d.

The code arrangement of each of the record signals respectively provided at the four rotary heads will now be described with reference to FIGS. 3A and 3B. As shown in FIG. 3A, each half horizontal period of effective video information includes 384 samples and this half horizontal period of video information is divided into four blocks of 96 samples each, with each block being supplied at output terminals 8a–8d of the recording section of FIG. 1. The time compression circuit 3 in each channel compresses the video signal to provide a data blanking period for each block of video information into which a synchronizing signal, an identification signal and error correction words can be inserted. This is shown more particularly in FIG. 3B in which each block of the coded digital signal (video data or parity data) is composed of a block synchronizing signal (SYNC) of three samples, an identification (ID) signal and address (AD) signal of two samples, identification signal check words $P_1$ and $Q_1$ of two samples, followed by the 96 samples of video information and video data check words $P_2$ and $Q_2$ of four samples. The block synchronizing signal is used for identifying the beginning of a block, whereupon the identification and address signals, the information data and the check words can be extracted. The identification signal ID indicates the channel (track), the frame, the field and the line to which the information data of the block belongs and whether such information data is even or odd, and the address signal AD represents the address of the respective block, that is, the location of the video data in each field. The check words constitute an error correcting code used for detection of errors in the data of the respective blocks.

Figure 6:
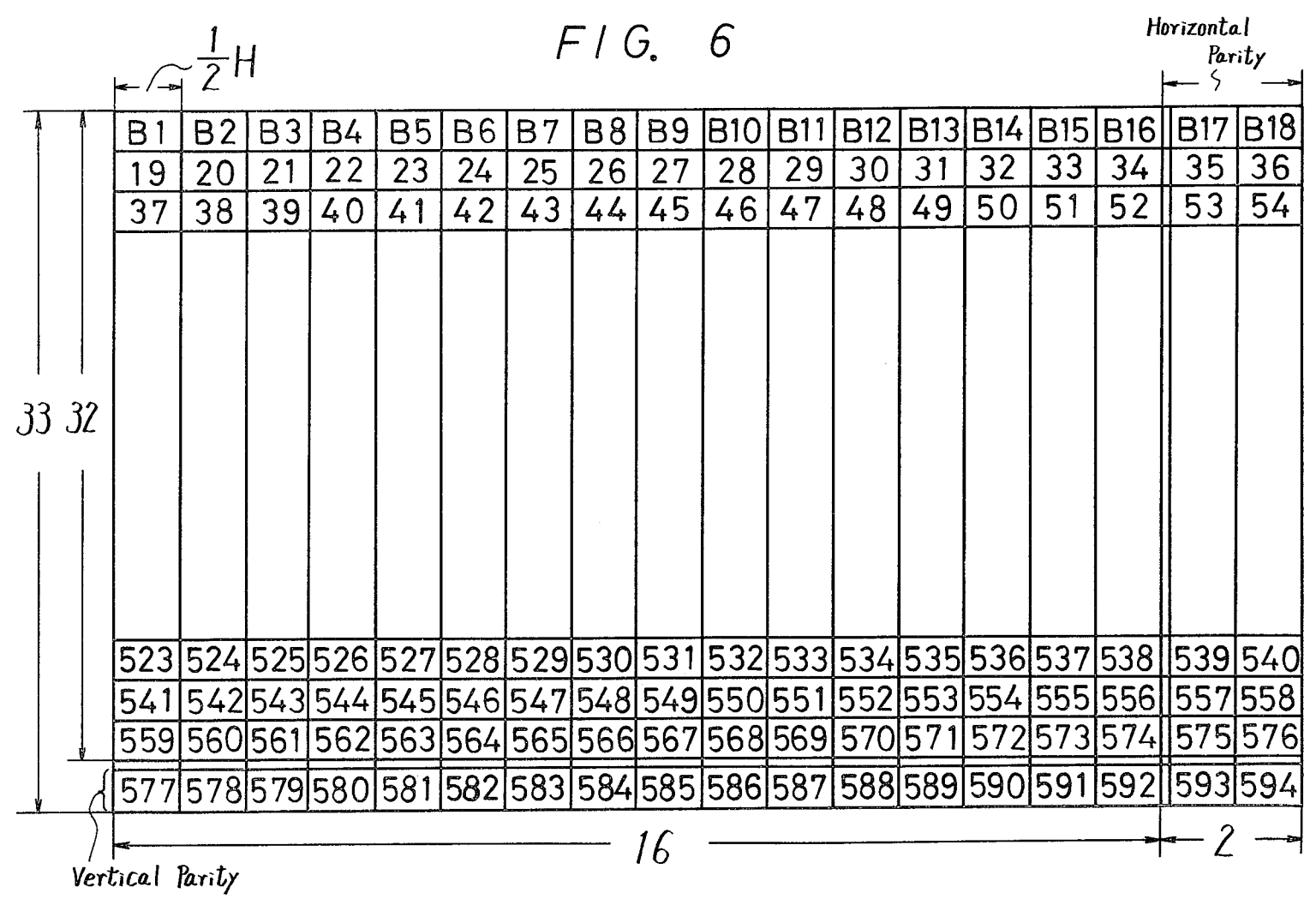

FIG. 6 shows the code arrangement for video data recorded in each track. More particularly, the number of horizontal lines forming each field is 262.5H. Accordingly, the number of effective video lines in one field period is selected to be 256H, excepting the vertical synchronizing period. Since each horizontal period is comprised of 8 blocks, each field interval is comprised of 2,048 ($=256\times8$) blocks with 2,048/4 or 512 blocks being recorded in each track for each field. In FIG. 6, each reference character Bi (i=1~594) indicates one block which is referenced by an address signal AD, and with two blocks making up one line of information per track. The video data for each track is sequentially arranged in a 32×16 matrix form. Parity data is also provided in connection with the horizontal and vertical directions, respectively, of the video data in the matrix. More particularly, the parity data for the horizontal direction is shown positioned in columns 17 and 18 of the matrix and the parity data for the vertical direction is positioned in row 33 at the bottom. In the 17th and 18th columns of blocks at the 33rd row is disposed the horizontal parity data for the vertical parity data.

The parity data for the horizontal direction is formed from alternate blocks of the 16 blocks forming the respective row of the matrix. In the first row, for example, parity block $[B_{17}]$ is formed by the modulo-2 addition:

$$[B_1]\oplus[B_3]\oplus[B_5]\oplus-\oplus[B_{13}]\oplus[B_{15}]=[B_{17}] \quad (1).$$

In the above equation, (Bi) means only the data in the respective block Bi. In this case, samples belonging to respective ones of the blocks are calculated in a parallel, 8-bit form. Similarly, by the modulo-2 addition:

$$[B_2]\oplus[B_4]\oplus[B_6]\oplus-\oplus[B_{14}]\oplus[B_{16}]=[B_{18}] \quad (2),$$

parity block $[B_{18}]$ is formed. The parity data is similarly formed for each of the second to 32nd rows in the horizontal direction. Enhancement of the error correcting ability results from the fact that parity data is not formed merely by the data of the 16 blocks included in a row, but is also formed by the data of alternate blocks positioned in the row.

The parity data for the vertical direction is formed by the data of 32 blocks in each of the first to 16 columns of blocks. In the first column, parity block $[B_{577}]$ is formed by the modulo-2 addition:

$$[B_1]\oplus[B_{19}]\oplus[B_{37}]\oplus-\oplus[B_{541}]\oplus[B_{559}]=[B_{577}] \quad (3).$$

In this case, samples belong to the respective blocks are calculated in a parallel, 8-bit form.

Figure 5:
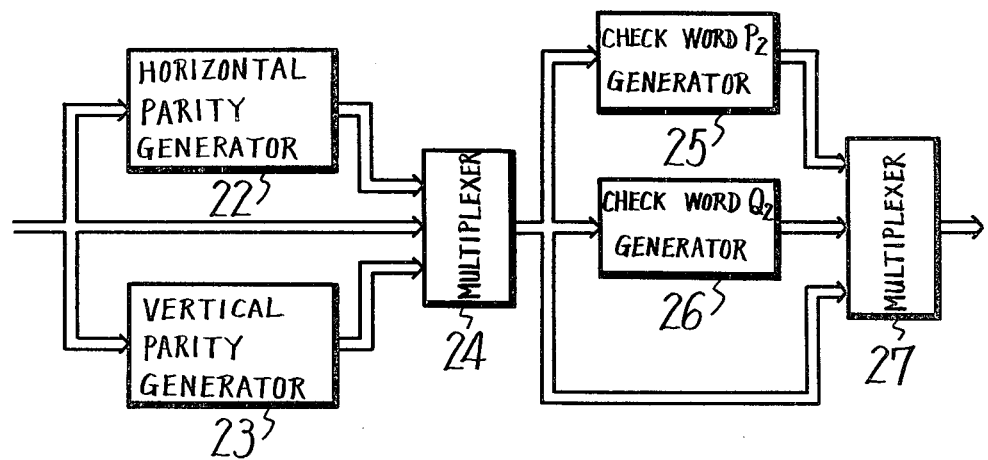
FIG. 5 is a block diagram of one embodiment of an error correcting encoder according to this invention which can be used in the recording section of FIG. 1.

Referring back to FIG. 1, the time base compression circuit 3a or 3b in each channel compresses the video data and provides a data blanking period in which the block synchronizing signal, the identification and address signals and the check codes are inserted for each block of video data of 96 samples, and at the same time, sets up data blanking periods in which the blocks of the parity data are inserted. The output of the time base compression circuit 3a or 3b in each channel is supplied to the respective error correcting encoder 4a or 4b in which the parity data for the horizontal and vertical directions and the check words for each block are generated. One embodiment of an error correcting encoder in accordance with the present invention is shown in FIG. 5 to include a horizontal parity generator 22, a vertical parity generator 23 and a multiplexer 24, each supplied with the output from its respective time base compression circuit 3a or 3b. The horizontal parity generator 22 and vertical parity generator 23 generate horizontal and vertical parity data, respectively, from each ¼ field of video data, such parity data also being supplied to multiplexer 24. The output of multiplexer 24 is supplied to a check word $P_2$ generator 25 for the video data, a check word $Q_2$ generator 26 for the video data and to a multiplexer 27. The outputs from generators 25 and 26 are also supplied to multiplexer 27 and the latter adds the data check words $P_2$ and $Q_2$ to the video data and parity data in the form shown in FIG. 3B, and the output therefrom constitutes the output from the error correcting encoder 4a or 4b.

The block synchronizing signal and the identification and address signals are then added to the video and parity data in the recording processor 5a or 5b in each channel. The address signal AD represents the previously noted number (i) of the block. Further, in each recording processor 5a or 5b, there is provided an encoder of the block coding type which converts the number of bits of one sample from 8 to 10, and a parallel-to-serial converter for serializing the parallel 10-bit code. As disclosed in detail in U.S. Patent Application Ser. No. 06/171,481, filed July 23, 1980, and having a common assignee herewith, the block coding is such that $2^8$ codes whose DC levels are close to zero are selected from $2^{10}$ codes of 10-bit words and arranged to have one-to-one correspondence to the original 8-bit codes. By means of the foregoing, the DC level of the record signal is made as close to zero as possible, that is, "0" and "1" alternate with each other as much as possible. Such block coding is employed for preventing degradation of the transmitting waveform on the playback side by substantial DC free transmission. Further, since information included in the identification signal ID in each block is important for processing in the reproducing system, each recording processor 5a or 5b further generates identification signal check codes $P_1$ and $Q_1$ and adds the same to each block as shown in FIG. 3B.

The output of recording processors 5a and 5b are fed to multiplexer 6 where they are distributed to 4 channels through recording amplifiers 7a–7d to output terminals 8a–8d, respectively, as previously discussed. Four rotary heads are connected to output terminals 8a–8d through, for example, rotary transformers, whereby one scan by the four heads functions to record four parallel tracks 9a–9d extending obliquely on magnetic tape 10 which constitute one field of video information.

Referring now to FIG. 2, a reproducing section of a digital VTR embodying this invention includes four input terminals 11a–11d for receiving the digital video signal reproduced by the four rotary heads. In particular, in the reproducing or playback operation of the digital VTR according to this invention, the reproduced video data signals are derived from the four rotary heads which scan tracks 9a–9d, respectively, and are applied through playback amplifiers 12a–12d to playback processors 13a–13d, respectively. The latter playback processors perform a waveshaping operation, convert the serial data into parallel form, extract the block synchronizing, identification (ID) and address (AD) signals and the check codes from the data, and further, perform a block decoding or 10-bit to 8-bit conversion operation. In addition, in the block decoding operation, each 96-sample block of data is error detected for every 24 samples thereof. The outputs of playback processors 13a–13d are applied to respective time base correctors 14a–14d in which any time base error in the data is removed.

The data of each channel is provided from the respective time base correctors 14a–14d by way of a multiplexer 15 and an interchanger 16 to error correcting decoders 17a and 17b. In particular, the outputs from time base correctors 14a–14d are first applied to a multiplexer 15 in which the four outputs are reassembled into two channels, and interchanger 16 functions to restore the mixed data from multiplexer 15 to its correct order. In other words, in an ordinary playback operation in which the rotary heads faithfully scan the recording tracks on the magnetic tape or in slow motion or still picture playback in which the rotary heads are controlled in position so that they faithfully follow the recording tracks, respectively, signals are reproduced only from the tracks corresponding to the four rotary heads. However, during high speed reproducing, in which the running speed of the magnetic tape is as high as several tens of times its ordinary speed, the inclination of the scanning direction of the heads is different from that of the record tracks, as shown by the broken lines 9' in FIG. 4, so that each head scans a plurality of record tracks during each scan. As a result, the signals reproduced from the different tracks are mixed together. In such a case, interchanger 16 identifies the correct channels of the reproduced signals, using track identification signals, and supplies the reproduced signals to the error correcting decoders 17a and 17b and, in particular, to the correct addresses in memories thereof, for the respective channel. In the case of reproduction at the normal reproducing speed, the data from multiplexer 15 is merely passed through interchanger 16 to the respective error correcting decoders. The interchanger 16 is also provided at its input with decoders for correcting errors in the identification signal ID by using the identification signal check words $P_1$ and $Q_1$ (FIG. 3B).

Each error correcting decoder 17a and 17b includes error detecting and correcting circuits using the horizontal and vertical parity data and the various data check words $P_2$ and $Q_2$. It should be appreciated that, during high speed reproducing, no error detection and correction are carried out using the horizontal and vertical parity data, even though errors in the respective identification signals are corrected in interchanger 16. The error correcting decoders 17a and 17b each include a field memory. If uncorrectable data is reproduced, that is, data with too many errors therein, the data supplied to the error correcting decoders 17a and 17b is not written into the field memories, but rather, data which has preceded the uncorrectable data by one field is used in an interpolation or concealment process. The data from each error correcting decoder 17a and 17b is applied to respective time base expander circuits 18a and 18b which return the data to the original transmitting rate and then apply the data to a common multiplexer 19. The multiplexer 19 serves to return the reproduced data of the two channels into a single channel which is, in turn, supplied to a signal processor 20 from which a reproduced color video signal is provided at an output terminal 21. Signal processor 20, as will hereinafter be described, separates the luminance and chrominance components from the color video signal by means of a digital filter in order to correct the phase of the color sub-carrier of the chrominance components, during a concealment operation, by using the identification signals ID. In addition, the digital color video signal is converted into an analog color video signal by a D/A (digital-to-analog) converter (not shown).

Figure 3B:
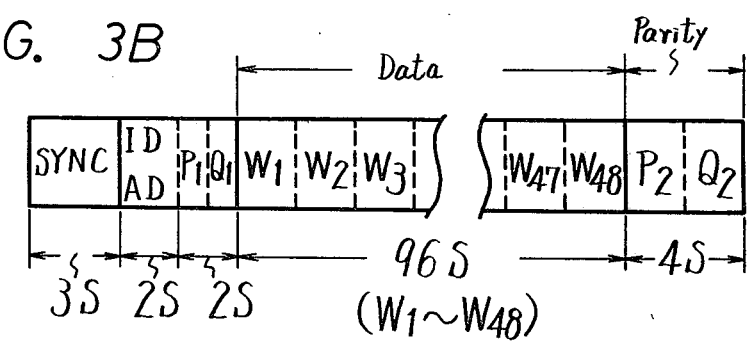

As previously discussed, data check words $P_2$ and $Q_2$ are added to each block of video data, as shown in FIG. 3B, which also includes 96 data samples or 48 data words $W_1, W_2-W_{48}$. Generally, when n words $W_1, W_2-W_{n-1}, W_n$ are included in one block, with each word being comprised of m-bits, two check words Q and P, each being comprised of m-bits, can be generated and then added to the block, by utilizing the following parity check matrix H:

$$H = \begin{bmatrix} T^0 & 0 & T^{-1} & T^{-2} & \ldots & T^{-(n-1)} & T^{-n} \\ 0 & T^0 & T^1 & T^2 & \ldots & T^{n-1} & T^n \end{bmatrix}, \quad (4)$$

where $T^0$ and O are m x m identity and zero matrices, respectively, and $T^{-1}, T^{-2}, -T^{-n}, T^1, T^2, -T^{n-1}, T^n$ are distinct, non-zero elements of a Galois field GF ($2^m$). "Addition" and "multiplication" operations are performed by a modulo-2 operation on the Galois field GF ($2^m$).

An irreducible generator polynomial G(x) of degree m over the Galois field GF (2) is expressed as follows:

$$G(x) = g_0 + g_1 X + - + g_{m-1} x^{m-1} + g_m x^m \quad (5).$$

From the above generator polynomial G(x), an m x m generator matrix T, as follows, can be obtained:

$$T = \begin{bmatrix} 0 & 0 & \ldots & 0 & g_0 & 0 \\ 1 & 0 & \ldots & 0 & g_1 & \\ 0 & 1 & \ldots & 0 & g_2 & \\ \vdots & & & & \vdots & \\ 0 & 0 & \ldots & 1 & g_{m-1} & \end{bmatrix}. \quad (6)$$

When G(x) is a primitive irreducible polynomial, a Galois field GF ($2^m$) having $2^{m-1}$ distinct, non-zero elements is obtained. If generator polynomial G(x) is a non-primitive irreducible polynomial, the number of elements in the Galois field GF ($2^m$) is less than $2^m$. Further, the number n of words $W_1, W_2-W_n$ in each block is selected to be an integer not greater than the number of distinct, non-zero elements in the Galois field GF ($2^m$). From these n words in each block two check words Q and P are formed as follows:

$$Q = \sum_{i=1}^{n} T^{-(n+1-i)} W_i \tag{7}$$

$$= T^{-1}W_n + T^{-2}W_{n-1} + \ldots + T^{-(n-1)}W_2 + T^{-n}W_1$$

$$P = \sum_{i=1}^{n} T^{n+1-i} W_i \tag{8}$$

$$= T^1 W_n + T^2 W_{n-1} + \ldots + T^{n-1}W_2 + T^n W_1.$$

Accordingly, the digitized video data is transmitted in series in the sequence $W_1, W_2$-$W_n$, P and Q, as shown specifically in FIG. 3B.

An error detection and correction operation during reproducing, utilizing the aforementioned check words Q and P, will now be described. Assuming that received digital signals $\overline{W}_i$, $\overline{P}$ and $\overline{Q}$ are constructed as follows:

$$\overline{W}_i = W_i + e_i \tag{9}$$

$$\overline{P} = P + e_p \tag{10}$$

$$\overline{Q} = Q + e_q \tag{11},$$

where $e_i$, $e_p$ and $e_q$ are error patterns contained in the words $\overline{W}_i$, $\overline{P}$ and $\overline{Q}$, then one block of reproduced digital signals can be expressed by a row vector (or matrix), as follows:

$$V = (\overline{Q}, \overline{P}, \overline{W}_n, \overline{W}_{n-1}, \overline{W}_2, \overline{W}_1) \tag{12}.$$

If the row vector or matrix V is transposed, a transposed matrix $V^T$ is formed and multiplied by the parity check matrix H of equation (4) to form syndromes $S_1$ and $S_2$, as follows:

$$\begin{bmatrix} S_1 \\ S_2 \end{bmatrix} = H V^T \tag{13}$$

$$S_1 = \overline{Q} + \sum_{i=1}^{n} T^{-(n+1-i)} \overline{W}_i \tag{14}$$

$$S_2 = \overline{P} + \sum_{i=1}^{n} T^{n+1-i} \overline{W}_i. \tag{15}$$

Equations (14) and (15) can be rewritten as follows, in which only the error patterns are included in the newly formed equations:

$$S_1 = e_q + \sum_{i=1}^{n} T^{-(n+1-i)} e_i \tag{16}$$

$$S_2 = e_p + \sum_{i=1}^{n} T^{n+1-i} e_i. \tag{17}$$

Accordingly, syndromes $S_1$ and $S_2$ are used to perform the error detection and correction equation.

In particular, the error detection and correction operation works as follows. If no error exists in the data or check words $W_i$, then $e_i = e_p = e_q = 0$. Thus, from equations (16) and (17):

$$S_1 = S_2 = 0 \tag{18}.$$

If an error exists in either check word P or Q, but no error exists in any data word, $e_i = 0$ and:

$$\begin{cases} S_1 = e_q \\ S_2 = 0 \end{cases} \text{ or } \begin{cases} S_1 = 0 \\ S_2 = e_p. \end{cases} \tag{19}$$

In other words, when only one syndrome $S_1$ or $S_2$ becomes equal to zero, an error exists in check word P or Q. In such case, correction of the check words is impossible, but since the data word $\overline{W}_i$ as transmitted is correct, there is no necessity to provide any correction or concealment operation.

If an error exists in only one data word $\overline{W}_i$ at the (i)th position in one block $e_p = e_q = 0$ and $e_i \neq 0$. In this case, equations (16) and (17) reduce to a much simpler form, as follows:

$$S_1 = T^{-(n+1-i)} e_i \tag{20}$$

$$S_2 = T^{(n+1-i)} e_i \tag{21}.$$

By rearranging the terms of equations (20) and (21), the following equation can be obtained:

$$T^{n+1-i} S_1 = T^{-(n+1-i)} S_2 = e_i \tag{22}.$$

If i is changed sequentially in the order 1,2,3–(n−1), n, the value for i at which equation (22) is satisfied can be found. In other words, at the value for i that equation (22) is satisfied, the error position i of the erroneous word and the error pattern $e_i$ can be determined in order to perform an error correction operation by using the arrangement of equation (9).

In the case where more than one data word, for example, two data words, in a block contain an error, but no errors exist in the check words Q and P, $e_p = e_q = 0$, $e_i \neq 0$ and $e_j \neq 0$. In such case, equations (16) and (17) can be reduced as follows:

$$S_1 = T^{-(n+1-i)} e_i + T^{-(n+1-j)} e_j \tag{23}$$

$$S_2 = T^{n+1-i} e_i + T^{n+1-j} e_j \tag{24}.$$

Equations (23) and (24) can be simplified by multiplying both sides of equation (23) by $T^{n+1}$ and by multiplying both sides of equation (24) by $T^{-(n+1)}$ to obtain the following equations:

$$T^{n+1} S_1 = S_1^* = T^i e_i + T^j e_j \tag{25}$$

$$T^{-(n+1)} S_2 = S_2^* = T^{-i} e_i + T^{-j} e_j \tag{26}.$$

By performing various operations and combining equations (25) and (26), the following equation can be obtained:

$$T^{-i} S_1^* + T^i S_2^* = (T^{i-j} + T^{-(i-j)}) e_j \tag{27}.$$

By rearranging the terms of equation (27), an equation for the error pattern $e_j$ can be obtained:

$$e_j = (T^{(i-j)} + T^{-(i-j)})^{-1} \times (T^{-i} S_1^* + T^i S_2^*) \tag{28}.$$

In like manner, by performing various operations and combining equations (25) and (26), the following new equation can be obtained:

$$T^{-j} S_1^* + T^j S_2^* = (T^{i-j} + T^{-(i-j)}) e_i \tag{29}.$$

By rearranging the terms of equation (29), an equation for the error pattern $e_i$ can be obtained:

$$e_i = (T^{(i-j)} + T^{-(i-j)})^{-1} \times (T^{-j}S_1^* + T^{j}S_2^*) \quad (30).$$

It should be appreciated that, when both syndromes $S_1$ and $S_2$ are not equal to zero, an error exists in at least one digital word in a block. Since equation (30) does not satisfy the relation of equation (22) corresponding to the case where an error exists in only one word, two or more words in the block contain an error. Since errors in more than one word are practically uncorrectable, according to the present invention, it is determined that the entire block is uncorrectable and a concealment operation is performed. It should be noted, however, that if the error positions $i$ and $j$ can be detected by, for example, utilizing a pointer, the error patterns $e_i$ and $e_j$ can be obtained from equations (28) and (30) so that erroneous words $\overline{W}_i$ and $\overline{W}_j$ can be corrected.

There will now be discussed the case where error patterns at different positions ($i \neq j$) are equal to each other, this being a particular situation of the two word error case discussed above. In particular, in this case, $e_p = e_q = 0$, $e_i \neq 0$, $e_j \neq 0$ and $e_i = e_j$. Further, as with equations (23) and (24), $S_1 \neq 0$ and $S_2 \neq 0$. However, in this situation, the error correcting code has a high error detecting capability so that the erroneous words $\overline{W}_i$ and $\overline{W}_j$ can be corrected.

By utilizing the above arrangements, it can easily be determined whether erroneous words in each block can be corrected and, if not, that a concealment operation should be performed.

As an example of the above operation, for generating the identification signal check words $P_1$ and $Q_1$, the following generator polynomial $G_1(x)$ can be used:

$$G_1(x) = x^8 + x^4 + x^3 + x + 1 \quad (31).$$

The generator polynomial $G_1(x)$ can then be used to define a generator matrix $T_1$, as follows, for use in obtaining the identification signal check words $P_1$ and $Q_1$:

$$T_1 = \begin{bmatrix} 0 & 0 & 0 & 0 & 0 & 0 & 0 & 1 \\ 1 & 0 & 0 & 0 & 0 & 0 & 0 & 1 \\ 0 & 1 & 0 & 0 & 0 & 0 & 0 & 0 \\ 0 & 0 & 1 & 0 & 0 & 0 & 0 & 1 \\ 0 & 0 & 0 & 1 & 0 & 0 & 0 & 1 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \end{bmatrix} \quad (32)$$

For the video data, which includes 48 words of 16 bit length for each block, the following generator polynomial $G_2(x)$, for example, can be used for generating the check words $P_2$ and $Q_2$:

$$G_2(x) = x^{16} + x^{15} + x^8 + x^2 + 1 \quad (33).$$

The generator polynomial $G_2(x)$ is then used to define a generator matrix $T_2$ for use in generating the check words $P_2$ and $Q_2$.

Figure 7:
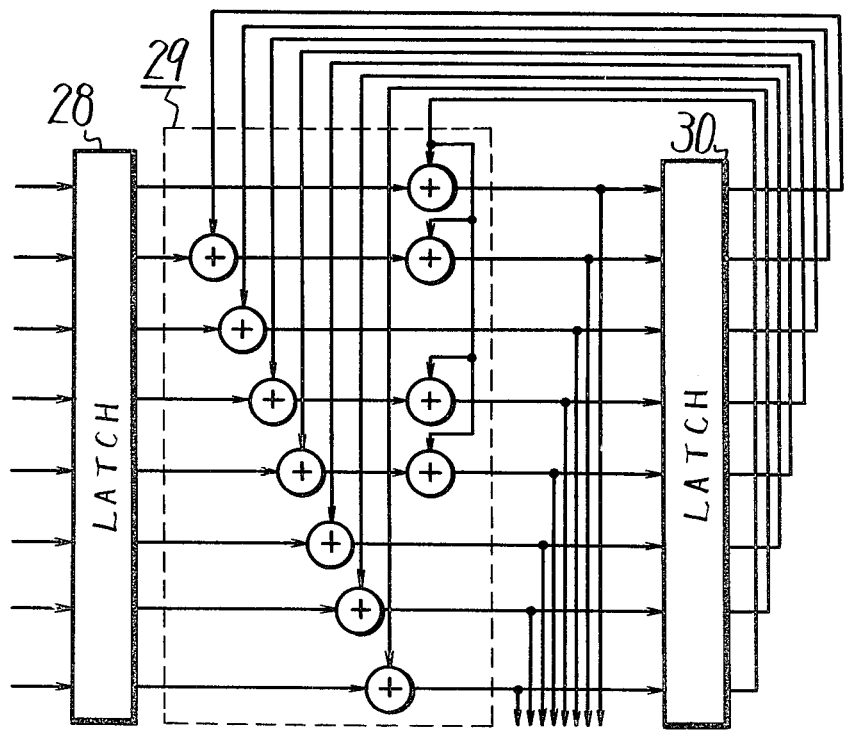
FIG. 7 is a block diagram illustrating one embodiment of an identification signal check word generator according to this invention for use in the recording section of FIG. 1.

As previously discussed, the identification ID and address AD signals are added to each block in recording processors 5a and 5b. These latter processors also generate check words $P_1$ and $Q_1$, shown in FIG. 3B, which are used for detecting and correcting errors in the identification signal ID. Accordingly, each recording processor 5a and 5b includes a check word $P_1$ generator and a check word $Q_1$ generator which function in much the same manner as check word $P_2$ generator 25 and check word $Q_2$ generator 26 previously discussed in regard to FIG. 5. In particular, one embodiment of a check word $P_1$ generator that can be utilized is shown in FIG. 7 to include a latch circuit 28 which successively receives 8-bit words in parallel. A $T_1$ (generator matrix) operating circuit 29 is supplied with the output from latch circuit 28 and, in turn, supplies an output to a latch circuit 30 also of the check word $P_1$ generator. The output from $T_1$ operating circuit 29 functions as the output of the check work $P_1$ generator. The output from latch circuit 30 is then fed back to $T_1$ operating circuit 29. Accordingly, $T_1$ operating circuit 29 operates on the outputs from latch circuits 28 and 30 in accordance with the generator matrix $T_1$ described above. More particularly, $T_1$ operating circuit 29 is provided with modulo-2 adders, that is, exclusive-OR gates, which are respectively connected in a configuration corresponding to the positions of occurrence of "1" in the aforementioned generator matrix $T_1$. The identificaton signal ID is generally comprised of two words $W_1$ and $W_2$. Thus, in operation, at the time when the first word $W_1$ is supplied to latch circuit 28, latch circuit 30 has been cleared. The word $W_1$ is then supplied from latch circuit 28 to $T_1$ operating circuit 29 and the output $T_1{}^0W_1$ from operating circuit 29 is stored in latch circuit 30. When the next word $W_2$ is supplied to latch circuit 28, the output $T_1{}^0W_1$ from latch circuit 30 is also supplied to $T_1$ operating circuit 29. Consequently, $T_1$ operating circuit 29 generates an output $T_1{}^0W_2 + T_1{}^1W_1$ which is supplied to latch circuit 30. Latch circuit 28 is then cleared and the output from latch circuit 30 is fed back to $T_1$ operating circuit 29 to derive the check word $P_1$ in the form of $T_1{}^1W_2 + T_1{}^2W_1$. In a similar manner, check word $Q_1$ is generated by using an operating circuit corresponding to a generator matrix $T_1{}^{-1}$. Further, check word $P_2$ generator 25 and check word $Q_2$ generator 26 in error correcting encoders 4a and 4b are provided with operating circuits similar to that shown in FIG. 7 in accordance with the aforementioned generator polynomial $G_2(x)$. Accordingly, check words $P_1$, $Q_1$, $P_2$ and $Q_2$ are generated and inserted into each block as shown in FIG. 3B, for use in the reproducing section of FIG. 2 for detecting and correcting errors in each block of video information.

Figure 8:
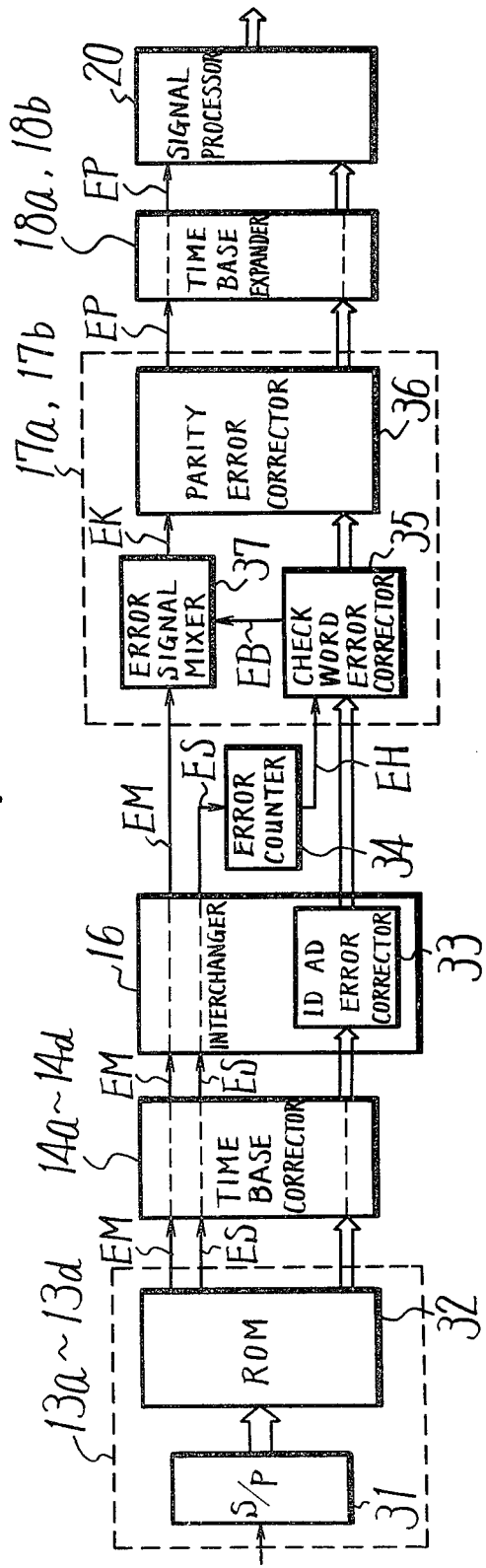
FIG. 8 is a more detailed block diagram of a portion of the reproducing section of FIG. 2 according to this invention.
Figure 9:
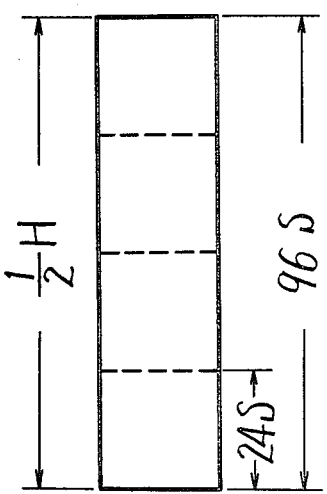
FIG. 9 is a schematic illustration used for explaining the division of one block of signal video information.

Referring now to FIG. 8, there is shown a more detailed schematic of one channel of a portion of the reproducing section of FIG. 2 for use in an error detection and correction operation, with multiplexers 15 and 19 being omitted for the sake of brevity of description. In particular, the reproduced data from one of amplifiers 12a–12d is supplied to a respective one of the playback processors 13a–13d where the 10-bit data samples are converted to parallel form by a series-to-parallel (S/P) converter 31 and then supplied to a read-only memory (ROM) 32, also in each playback processor 13. In ROM 32, a 10-bit to 8-bit conversion operation is performed. In particular, ROM 32 functions to convert 10-bit code words to 8-bit code words in accordance with a predetermined mapping function, for example, as described in detail in the aforementioned commonly assigned U.S. patent application Ser. No. 06/171,481, filed July 23, 1980. As described therein, the block coding is such that $2^8$ codes whose DC levels are close to zero are selected from $2^{10}$ codes of 10-bit words and arranged to have one-to-one correspondence to the original 8-bit codes. By means of the foregoing, the DC level of the record signal is made as close to zero as possible, that is, "0" and "1" alternate with each other as much as possible. In other words, the number of successive "0" or "1" bits is limited to a minimum. It should be appreciated that, with such mapping function, various 10-bit words from the $2^{10}$ possible combinations thereof were not selected in the recording section of FIG. 1 in the corresponding 8-to-10 bit conversion operation. Accordingly, when one of such 10-bit words which was not selected is reproduced, the reproduced data is erroneous. With such an arrangement, the probability of error detection is approximately 75%, while the probability of an error being missed or passed over is 25%. In other words, the probability of missing an error in each word is still relatively high. Thus, in accordance with the present invention, it is proposed to group a plurality n of words into one unit, for example, one quarter of a block, and when one word in the unit is detected to contain an error, the entire unit is regarded an erroneous. Accordingly, the probability of missing or passing over an error of the unit becomes $(\frac{1}{4})^n$ which is extremely low. It should be appreciated that the more words in each unit, the higher the probability of finding an error in the unit. In the present invention, each block of video data includes 96 samples (48 words), as shown in FIG. 3B. Each block is further divided into four equal units of 24 samples (12 words) for use in the error detection operation. Thus, when any one of the 24 samples in each unit contains an error, all of the 24 sample data in that unit is regarded as erroneous.

Referring back to FIG. 8, ROM 32 of each playback processor 13 generates an error signal EM which is at logic level "1" when one of the 24 samples in a unit contains an error and is at logic level "0" when no error is present in any word of a unit. In other words, when one of the 10-bit words of reproduced data does not correspond to one of the 10-bit words previously selected in the mapping function, error signal EM is at logic level "1". In addition, each ROM 32 generates a second error signal ES for indicating the existence of an error in each sample and functions in much the same manner as error signal EM. Error signals EM and ES, along with the converted 8-bit data, are supplied through the respective time base corrector $14a$–$14d$ to interchanger 16. Interchanger 16 includes an ID/AD error corrector 33 for correcting errors in the identification signal ID and address signal AD in each block by using check words $P_1$ and $Q_1$. As previously discussed, the description of multiplexer 15 in FIG. 8 has been omitted merely for the sake of brevity of description.

From interchanger 16, the 8-bit data and error signal EM are supplied to the respective error correcting decoder $17a$ or $17b$, and error signal ES from interchanger 16 is supplied to an error counter 34. The latter counter functions to detect the number of erroneous samples contained in each block by counting the error signal ES. Accordingly, error counter 34 generates an error signal EH which is at logic level "0" when the number of samples containing an error exceeds the correcting capability of the system, that is, when two or more words in a block contain an error. The error signal EH is at logic level "1" when the system, by utilizing data check words $P_2$ and $Q_2$, is capable of correcting the errors.

Each error correcting decoder $17a$ or $17b$ includes a check word error corrector 35 for performing an error detection and correction operation for each block by using data check words $P_2$ and $Q_2$. The error signal EH from error counter 34 along with the data from interchanger 16 are supplied to check word error corrector 35 whereby an error correction operation is performed using data check words $P_2$ and $Q_2$ when the error signal EH is at logic level "1". When error signal EH is at logic level "0", check word error corrector 35 generates an error signal EB which, along with error signal EM from interchanger 16, is supplied to an error signal mixer 37. It should be appreciated that error signal EM is at logic level "0" when it is determined that a unit is correctable but is at logic level "1" when it is determined that the unit is uncorrectable. Accordingly, error signal mixer, in response to error signals EM and EB, generates an error signal EK which is at logic level "1" for each unit of 24 samples that is uncorrectable. In addition, check word error corrector 35 passes the uncorrected data when error signal EH is at logic level "0".

The error signal EK from error signal mixer 37 and the data, whether corrected or uncorrected, from check word error corrector 35, are supplied to a parity error corrector 36 which performs an error correction operation by using horizontal and vertical parity data. In particular, when error signal EK from error signal mixer 37 indicates that the unit of data supplied to parity error corrector 36 is correctable, parity error corrector 36 performs the aforementioned error correction operation by using the horizontal and vertical parity data.

However, when error signal EK indicates that the unit is uncorrectable, parity error corrector 36 receives the uncorrected data from check word error corrector 35 and performs an interpolation or concealment operation by utilizing data from the previous field. Parity error corrector 36 transmits the data, whether interpolated, corrected, or unchanged if no error exists, along with an interpolation signal EP which indicates whether the output data therefrom is interpolated, through the respective time base expander circuit 18 to signal processor 20. In the case where an interpolation operation has been performed, a corresponding unit from the field immediately preceding the field of the erroneous unit is substituted therefor. In such case, signal processor 20 ensures that the phase of the color sub-carrier of the interpolated data is converted, if necessary, into a phase which coincides with a reference phase.

Figure 10:
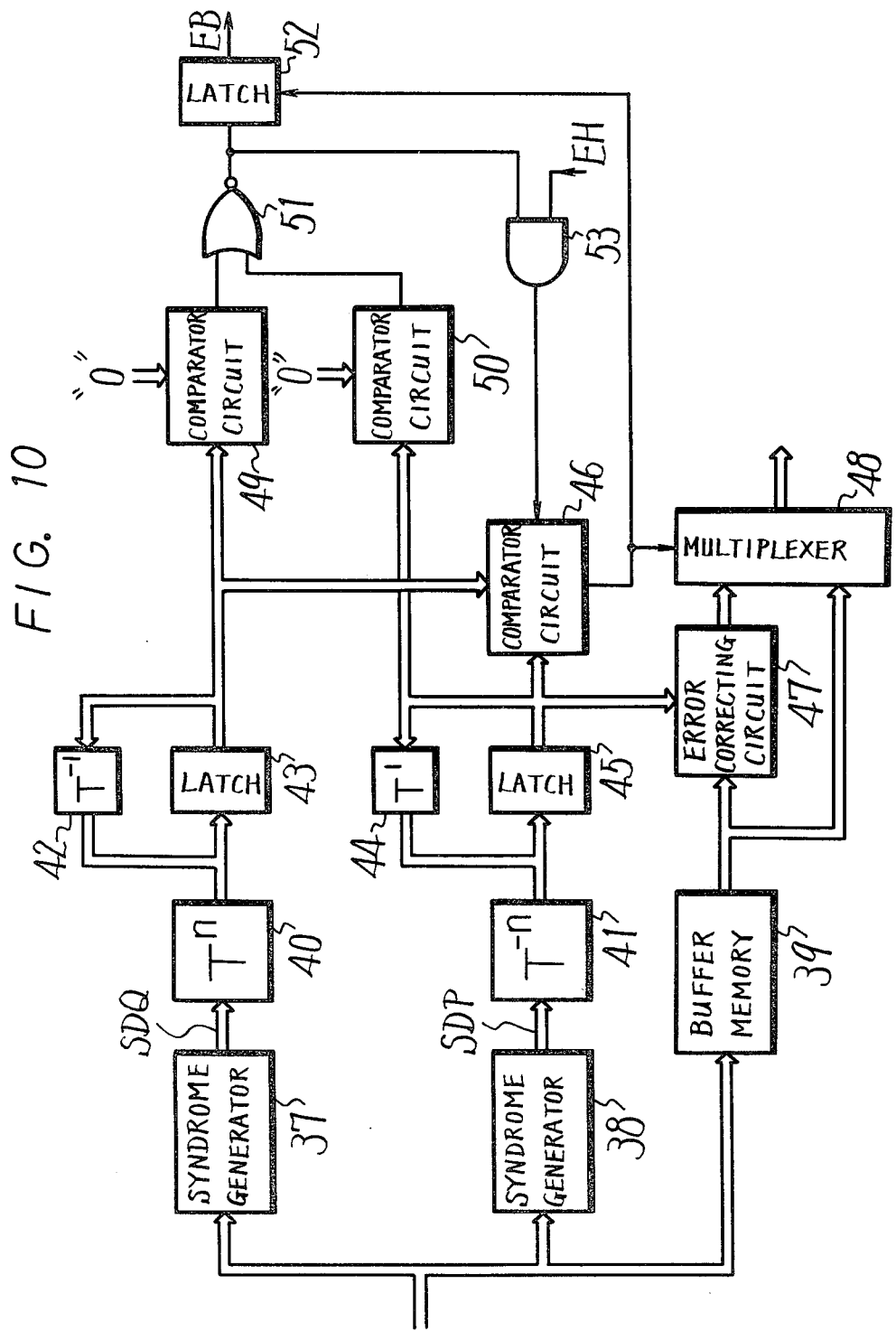
FIG. 10 is a block diagram of one embodiment of a check word error corrector according to this invention for use in the reproducing section of FIG. 8.

Referring now to FIG. 10, there is shown a more detailed diagram of one embodiment of the error corrector 35 according to this invention that can be utilized with the error correcting decoders $17a$ and $17b$ of FIGS. 2 and 8. As shown therein, video data for one block, that is, data including 48 words of 16-bits each, along with check word and parity data, are supplied to syndrome generators 37 and 38 and to a buffer memory 39. Syndrome generator 37 generates a syndrome SDQ (or $S_1$ as previously discussed) from each 48 words of video data and from check word $Q_2$ in each block. In like manner, syndrome generator 38 generates a syndrome SDP (or $S_2$ as previously discussed) from each 48 words of video data and from check word $P_2$ in each block. Syndromes SDQ (or $S_1$) and SDP (or $S_2$) are formed in accordance with equations (14) and (15) and the respective generators are of similar construction to the check word $P_1$ generator shown in FIG. 7. Accordingly, when an error exists in only one data word in each block, that is, the (i)th word, syndromes SDQ and SDP are expressed by equations (20) and (21) which are simplified versions of equations (14) and (15). To carry out the operation exemplified by equations (22), syndrome SDQ is supplied to a $T^n$ operational circuit 40 where it is multiplied by $T^n$ to be converted into a syndrome $T^{i-1}e_i$. In like manner, syndrome SDP is supplied to a $T^{-n}$ operational circuit 41 where it is multiplied by $T^{-n}$ and converted into a syndrome $T^{1-i}e_i$. Since a period for one block is necessary for generating these syndromes, buffer memory 39 functions to delay the received data by such period.

The output from $T^n$ operational circuit 40 is supplied to a latch circuit 43 which includes a feedback loop comprised of a $T^{-1}$ operational circuit 42. The output from operational circuit 41, in like manner, is supplied to a latch circuit 45 which includes a feedback loop comprised of a $T^1$ operational circuit 44. After the outputs from operational circuits 40 and 41 are set in the respective latch circuits 43 and 45, the outputs from latch circuits 43 and 45 are fed back through operational circuits 42 and 44, respectively, to the inputs of the respective latch circuits 43 and 45 and this new data is latched therein. During each feedback operation, the outputs from latch circuits 43 and 45 are compared with each other in a comparator circuit 46 for detecting the correspondence therebetween. For example, when the (i)th word $\overline{W}_i$ contains an error, comparator circuit 46 produces an identity output at the (i)th timing. At such time, the outputs from latch circuits 43 and 45 constitute the error pattern $e_i$. The output from latch circuit 45 during each feedback operation is also supplied to an error correcting circuit 47, along with the output from buffer memory 39. Accordingly, when a word containing an error is produced by latch circuit 45, error correcting circuit 47 can perform an error correcting operation by the modulo-2 summation of $\overline{W}_i + e_i = W_i$ for that word.

A multiplexer 48 is supplied with the output from error correcting circuit 47 and the output from buffer memory 39 and functions to select one of the data outputs as the data output from check word error corrector 35, in response to the comparison operation by comparator circuit 46. In particular, when comparator circuit 46 detects a correctable error in one of the words of a block, it supplies an identity signal to multiplexer 48 which selects the corrected data output from error correcting circuit 47. When no error is detected by comparator circuit 46, or if the errors are not correctable, multiplexer 48 selects the data output from buffer memory 39.

The outputs from latch circuits 43 and 45 are also supplied to comparator circuits 49 and 50, respectively, for detecting whether the syndrome therefrom has a zero value. In this regard, comparator circuits 49 and 50 are also supplied with a logic level "0" input. Comparator circuits 49 and 50 supply a logic level "0" output when the syndromes from latch circuits 43 and 45, respectively, do not have a zero value. The outputs from comparator circuits 49 and 50 are supplied to respective inputs of a NOR gate 51 which generates a logic level "1" output only when an error exists in a block, that is, when the outputs from latch circuits 43 and 45 are both not equal to zero. The output from NOR gate 51 is supplied to a latch circuit 52 which, in turn, produces the aforementioned error signal EB. The identity output from comparator circuit 46, that is, the output which indicates that an error exists, is also supplied to latch circuit 52 for clearing the same. In addition, check word error corrector 35 includes an AND gate 53 supplied with the output from NOR gate 51 and the error signal EH from error counter 34. It is to be remembered that the error signal EH is at logic level "0" when the data in a block is uncorrectable, that is, when two or more words containing errors are presented in the block. AND gate 53 therefore produces a logic level "1" output only when error signal EH is at logic level "1" to indicate that less than two errors are present in the block and only when the output from NOR gate 51 is at logic level "1" to indicate that an error does exist in the block. In other words, AND gate 53 produces a logic level "1" output only when one error is present in the block. The output from AND gate 53 is supplied to comparator circuit 46 for rendering the same operational only when the output from AND gate 53 is at logic level "1". Accordingly, comparator circuit 46 only supplies the identity signal to multiplexer 48 for selecting the data output from error correcting circuit 46 when only one error is contained in the block. When more than one error is contained in the block or no errors exist in the block, comparator circuit 46 is effectively non-functional so that multiplexer 48 selects the data output from buffer memory 39.

Further, as previously discussed, if both syndromes from latch circuits 43 and 45 are not equal to zero, NOR gate 51 produces a logic level "1" output which is supplied through latch circuit 52 as the error signal EB. Thus, if only one error is present in the block, NOR gate 51 produces a logic level "1" output which is supplied to latch circuit 52. However, at this time, comparator circuit 46 clears latch circuit 52 so that a logic level "0" output is generated therefrom as the error signal EB. Only when the data is uncorrectable is error signal EB at logic level "1". In other words, when two or more errors are present, NOR gate 51 generates a logic level "1" output which is supplied to latch circuit 52, and comparator circuit 46 is effectively rendered non-functional and does not clear latch circuit 52.

Figure 11:
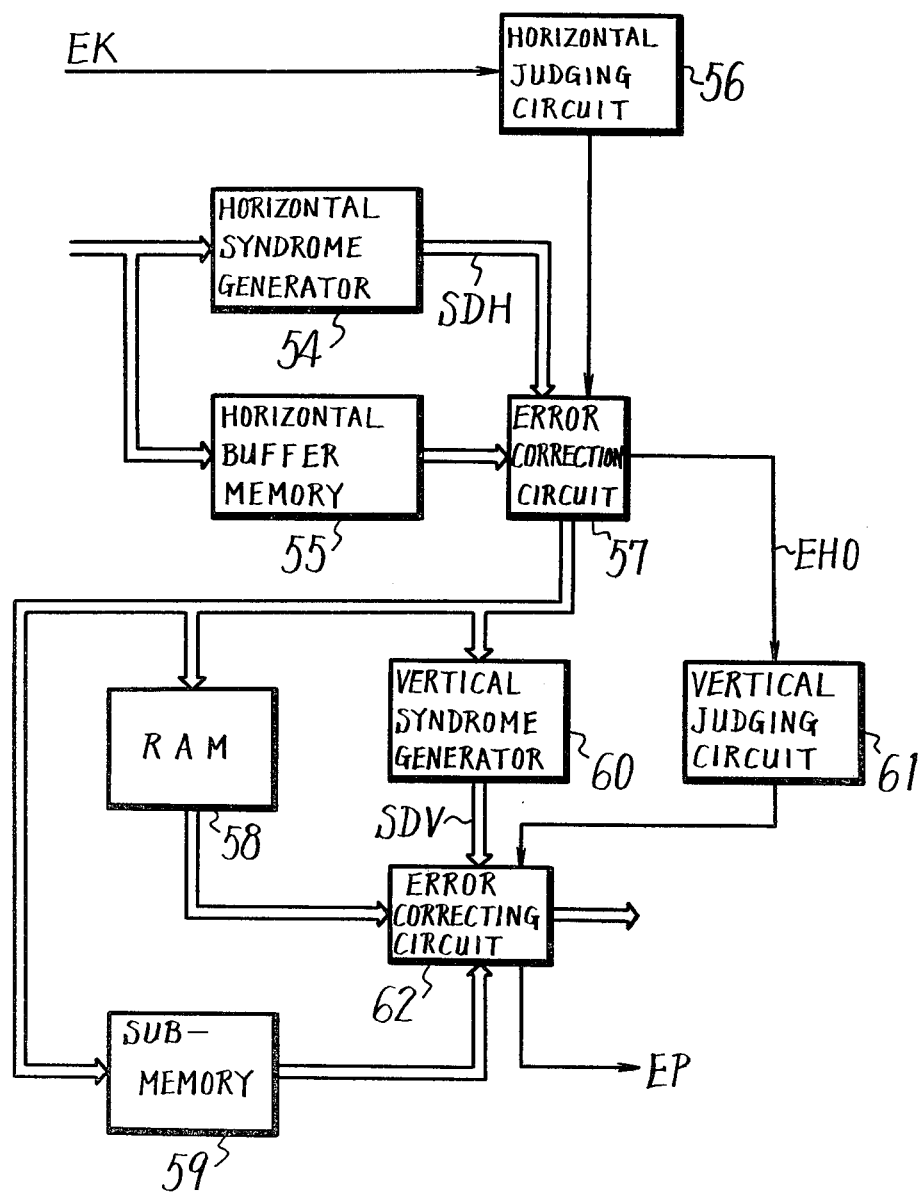
FIG. 11 is a block diagram of one embodiment of a parity error corrector according to this invention for use in the reproducing section of FIG. 8.

Referring now to FIG. 11, there is shown one embodiment of a parity error corrector 36 which can be utilized in the reproducing section of FIGS. 2 and 8. As shown therein, the data from check word error corrector 35 is supplied to a horizontal syndrome generator 54 and a horizontal buffer memory 55, and the error signal EK from error signal mixer 37 is supplied to a horizontal judging circuit 56, the latter circuit functioning to determine whether the data in each unit is capable of being corrected based upon the horizontal parity data. Horizontal syndrome generator 54 produces a horizontal syndrome SDH formed by the modulo-2 formation of eight alternate data blocks in a row and the one horizontal parity block corresponding thereto, as shown in FIG. 6. Since one row of data must be supplied to form the horizontal syndrome SDH, horizontal buffer memory 54 functions to delay the input data by such time. The syndrome signal SDH, the data from horizontal buffer memory 55, and the output from horizontal judging circuit 56 are all supplied to an error correction circuit 57. When horizontal judging circuit 56 determines that the error in the unit is correctable, it supplies a logic level "0" signal to error correcting circuit 57 which performs a modulo-2 summation operation with the data from horizontal buffer memory 55 and the horizontal syndrome SDH from horizontal syndrome generator 54. If horizontal judging circuit 56 determines that the error is uncorrectable, it supplies a logic level "1" signal to error correcting circuit 57 which merely passes the data from horizontal buffer memory 55.

The data from error correcting circuit 57 is supplied to a random-access-memory (RAM) 58, a sub-memory 59 and a vertical syndrome generator 60. At the same time, error correcting circuit 57 supplies an error signal EHO which is at logic level "0" if correction based on the horizontal parity data has been effected and is at logic level "1" if no error is present or if the error is uncorrectable, to a vertical judging circuit 61 which, in turn, produces an output signal in correspondence to error signal EHO. For example, vertical judging circuit 61 produces an output signal which indicates that a correction operation should be performed when error signal EHO is at logic level "0". When an error correction operation is to be performed, vertical syndrome generator produces a vertical syndrome SDV which, along with the output from sub-memory 59 and the output signal from vertical judging circuit 61, are supplied to an error correcting circuit 62 where an error correction operation is performed by means of the vertical parity data. When the data contains no error or if the errors are uncorrectable, vertical judging circuit 61 supplies an appropriate signal to error correcting circuit 62 which reads out the data from RAM 58. When the errors have been determined to be uncorrectable, error correcting circuit 62 produces the interpolation signal EP to indicate that an interpolation operation has been performed. When a correction operation is performed, the interpolation signal EP is at logic level "0" to indicate that no interpolation operation has been performed.

More particularly, in regard to the latter operation by parity error corrector 36, it is to be noted that RAM 58 has a storage capacity of ¼ of a field of data chosen from blocks B1 to B594 (FIG. 6). The writing in of data into RAM 58 is determined by the address signal AD and the identification signal ID for each 24 samples, that is, for each unit of data. Data is written into sub-memory 59 in the same manner. A memory control circuit (not shown), in response to the error signal EHO, functions to permit data containing an error to be written into sub-memory 59 while prohibiting the same data from being written into RAM 58. Accordingly, sub-memory 59 has a storage capacity of one horizontal row of data, that is, 18 blocks (FIG. 6) and the address for the data written into submemory 59 is stored as an error flag of one bit. When the vertical judging circuit 61 determines that the unit of data containing an error is correctable, the data read out from submemory 59 is supplied to error correction circuit 62 where it is corrected by means of the vertical syndrome SDV. However, when such errors are judged to be uncorrectable, the last data stored in RAM 58 is substituted therefor as interpolated data.

It should be appreciated that error signal EHO is produced for each unit of 24 samples and accordingly, the output signal from vertical judging circuit 61 is also produced for each unit of 24 samples. However, it sometimes occurs that one block of data may include one unit of 24 samples containing an error and another unit of 24 samples containing no error or containing errors which are uncorrectable. In such case, the unit of 24 samples containing correctable errors is written into sub-memory 59 but not into RAM 58. The unit of 24 samples containing errors which are correctable is then read out from sub-memory 59 and corrected in error correcting circuit 62, while the unit of 24 samples, for example, containing errors which are uncorrectable, is derived as interpolated data from RAM-58. When an entire block of four units is corrected in error correcting circuit 62, the identification signal ID from sub-memory 59 is added to each unit. However, when the error or errors in the block cannot be corrected, that is, where an interpolation process results, the identification signal ID from RAM 58 is added to each uncorrectable unit. In addition, when an interpolation operation results, interpolation signal EP is at logic level "1" and is at logic level "0" at all other times.

Figure 12:
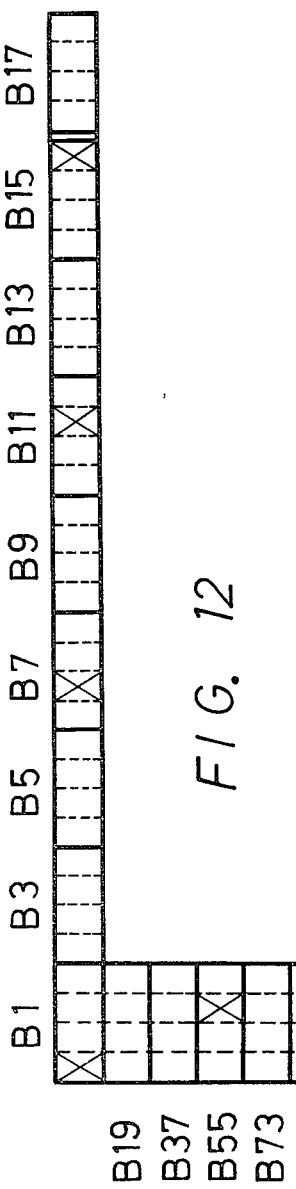
FIG. 12 is a schematic diagram used for explaining the operation of the parity error corrector of FIG. 11.

Accordingly, it should be appreciated that the error correcting operation in parity error connector 36 is performed for each 24 sample (12 word) unit with four units comprising one block in each channel. As shown in FIG. 12, the horizontal parity block B17 is formed by eight blocks (B1,B3,–B15). If the error correcting operation was performed on the entire block, an error in two or more blocks would make error correction impossible. However, since each of the blocks is divided into four 24 sample units with error correction being provided for each unit, the horizontal parity data in block B17 can be utilized to correct a maximum of four blocks containing errors. For example, as shown by the X-marks in the respective blocks, errors may be found in the first unit of block B1, the second unit of block B7, the third unit of block B11 and the fourth unit of block B15. Since the respective positions of the units in the blocks do not overlap, that is, no two blocks contain an error in the first unit thereof, the four 24 sample units of horizontal parity block B17 can be used to correct the errors in the respective units in blocks B1, B7, B11 and B15. The same analysis can be made with the vertical parity data in which it is shown for the first column that errors are contained in the first unit of block B1, the second unit of block B559, the third unit of block B55 and the fourth unit of block B505. If no other errors are present in the first column of blocks, the vertical parity block B577 can be used to correct the four errors present in the respective blocks B1, B55, B505 and B559.

Before proceeding with a description of signal processor 20, a brief discussion of the NTSC system will follow. In the NTSC system, as previously discussed, each frame comprises 525 lines which are divided into two fields such that the first field contains 262 lines and the second field contains 263 lines of data. Further, the phase of the color sub-carrier between corresponding lines of adjacent frames is inverted. Accordingly, if data from the corresponding field of an adjacent frame is substituted as interpolated data for uncorrectable data, an inversion of the sub-carrier will result. Therefore, during reproduction, any phase inversion of the color sub-carrier between successive reproduced blocks (or units) must be detected and corrected immediately. It should be appreciated, however, that it is only the chrominance portion of the video signal which contains the color sub-carrier. It is therefore only necessary to correct the chrominance portion of the digital video signal, rather than the entire video signal. Accordingly, it is desirable to separate the chrominance portion of the video signal from the luminance portion thereof, to correct the phase inversion of the separated chrominance portion, and then to recombine the separated chrominance and luminance portions.

Figure 13:
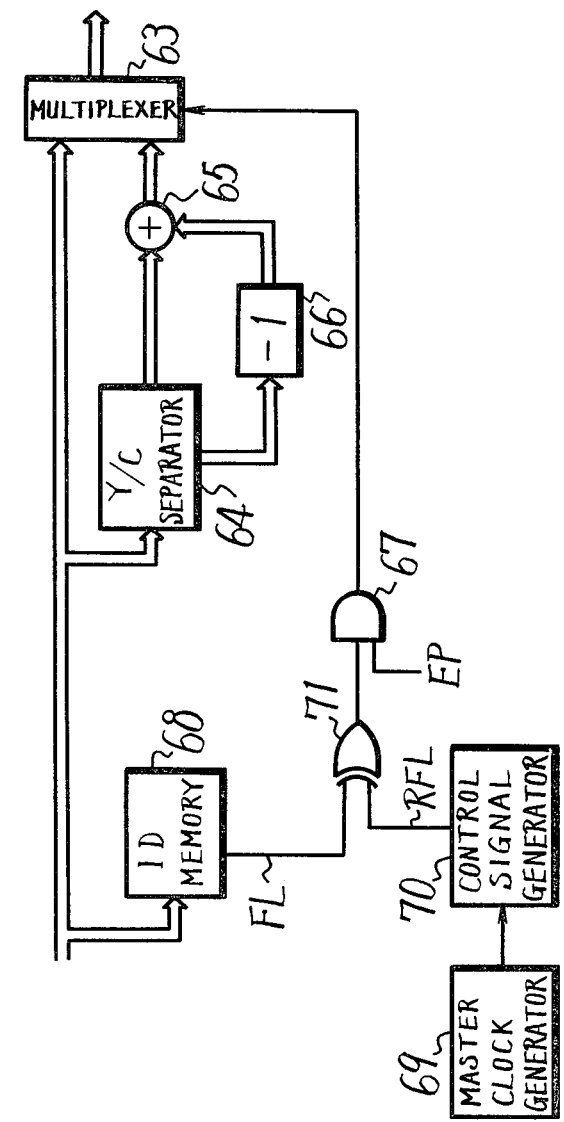
FIG. 13 is a block diagram of one embodiment of a reproducing signal processor according to this invention for use in the reproducing section of FIG. 8.

Referring now to FIG. 13, there is shown one embodiment of a signal processor 20 according to the present invention for use in the reproducing section of FIGS. 2 and 8. As shown therein, the video data, including the identification signal ID, from parity error corrector 36, is supplied to a multiplexer 63 and a luminance-chrominance (Y/C) separation circuit 64. The luminance (Y) signal from Y/C separation circuit 64 is supplied to an adder 65 and the chrominance (C) signal from Y/C separation circuit 64 is supplied through a phase inverter 66 to adder 65, the output of the latter then being applied to multiplexer 63. It should therefore be appreciated that the data supplied directly to multiplexer 63 from parity error corrector 36 has a sub-carrier of one phase while the data supplied from adder 65 has the phase of its sub-carrier inverted with respect to the aforementioned data. Multiplexer 63 selects one of the data inputs supplied thereto to provide at its output a reproduced video signal having a correct sub-carrier phase relation. In particular, multiplexer 63 is controlled by an output of an AND gate 67 so as to select the input data from parity error corrector 36 when the output signal from AND gate 67 is at logic level "0" and to select the data from adder 65 when the output signal from AND gate 67 is at logic level "1".

In this regard, signal processor 20 includes an identification (ID) memory 68 which is supplied with the identification signal (ID) added to each 24 sample unit in each block of the input data. The ID memory 68 produces an output signal FL, indicating whether the 24 sample unit stored therein is from an odd or even frame, and supplies the output signal FL to one input of an exclusive-OR gate 71. Further, a master clock generator 69 supplies a master clock signal to a control signal generator which, in turn, supplies an output signal RFL as a reference signal, for indicating whether the data should be of an odd or even frame, to another input of exclusive-OR gate 71. In addition, it is to be noted that control signal generator also generates various timing signals and control signals used for controlling the operation of the reproducing section of FIG. 2 from the read out sides of time base correctors 14a–14d to output terminal 21. It should therefore be appreciated that exclusive-OR gate 71 produces a logic level "0" signal when there is coincidence in the phase relation between the desired reference phase of the sub-carrier and the actual phase of the sub-carrier of each 24 sample unit. The output from exclusive-OR gate 71 is supplied to one input of AND gate 67 and the other input of AND gate 67 is supplied with the interpolation signal EP from parity error corrector 36. The interpolation signal EP, as will be remembered, is at logic level "1" for interpolated data of each 24 sample unit and is at logic level "0" when no interpolation operation has resulted. Accordingly, when no interpolation operation has occurred, the phase of the color sub-carrier of the data signal is automatically correct. At such time, interpolation signal EP is at logic level "0" and a logic level "0" signal is supplied to multiplexer 63 for selecting the data from parity error corrector 36. On the other hand, if a 24 sample unit is comprised of interpolated data, interpolation signal EP is at logic level "1". At such time, if the output signal FL from ID memory 68 is coincident with the reference signal RFL to indicate that the phase of the sub-carrier of that 24 sample unit is correct, exclusive-OR gate 71 supplies a logic level "0" signal to AND gate 67. In this regard, since the phase of the sub-carrier is correct, multiplexer 63 again selects the data from parity error corrector 36. However, if, during the interpolation process, the phase of the color sub-carrier has become inverted, there is no coincidence between signals FL and RFL whereby AND gate 67 supplies a logic level "1" signal to multiplexer 63 which, in response thereto, selects the data from adder 65. Since the data from adder 65 has had its color sub-carrier inverted, multiplexer 63 produces a sub-carrier having a continuous phase relation.

It should be appreciated that, in special reproducing modes, such as during quick motion reproduction, the different tracks 9a–9d may be traced by the rotary heads in a scanning path 9' shown by dashed lines in FIG. 4. When the video signal is processed in the reproducing section of FIG. 2, any error in the identification signal ID (FIG. 3B) will be corrected, for example, by means of identification signal check words $P_1$ and $Q_1$, while errors in a 24 sample unit may not be corrected because they are too numerous. In such case, interpolation data from RAM 58 is provided for the uncorrectable 24 sample unit so as to generate continuous video data. Since the identification signal ID is always correct, any error in the phase of the sub-carrier can therefore be corrected in signal processor 20, as previously discussed, with interpolation signal EP always being at logic level "1" to indicate that the 24 sample unit contains interpolated data.

Thus, in accordance with the present invention, detection of the code conversion process is utilized in performing the error correction operation. This, of course, results in a reduction in the redundancy. Further, in accordance with the present invention, when one word is detected to contain an error, the entire unit which includes the word containing the error is regarded as erroneous whereby to improve the probability of detecting an error. Further, since the error detection operation is performed for every unit or one-quarter block of video data by use of horizontal and vertical parity data, elaborate correction and concealment of a length of data less than one block can be performed. In this manner, both burst errors and random errors can be effectively corrected. It should also be appreciated that the present invention effectively reduces the redundancy in the error detection operation as compared with known methods in which the data is divided into a plurality of small units with each unit having an error detecting/correcting code affixed thereto. In addition, the present invention achieves a high detecting/correcting capability since each block of data has another error detecting/correcting code, that is, the check words $P_2$ and $Q_2$, affixed to each block of data. This, of course, is in addition to the horizontal and vertical parity data. Lastly, a more effective signal processing operation can be performed, particularly in special reproducing modes, where an error concealment operation is performed, since an error correcting code is also affixed to each identification signal ID.

It should be appreciated that various modifications may be effected within the scope of this invention. For example, although the above system has been explained with reference to an 8-to-10 block coding/encoding system, other block coding systems can be utilized. For example, a 3PM system in which 3-bit words are converted into 6-bit words may be utilized in which the minimum time interval between transitions of "0" and "1" bits is relatively long and the maximum time interval between transitions of "0" and "1" bits is relatively short. Thus, if the maximum time interval between transitions is 6T, when a time interval between transitions exceeds the interval 6T, the data can be considered to contain an error. Similarly, in an MFM coding system, the maximum time interval between transitions is 2T, and error detection is performed in the same manner. In addition, other than the NTSC system, the present invention is also applicable to the recording and/or reproducing of digital color video signals in a PAL system. Further, the present invention may also be utilized with a digital audio signal.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of processing a digital signal comprised of a plurality of N-bit words which have been code converted from a plurality of M-bit words in accordance with a predetermined mapping function, said method comprising the steps of:

reconverting each of said N-bit words to a respective one of said M-bit words in accordance with said mapping function, with said plurality of reconverted M-bit words forming a data unit for every predetermined number of words thereof;

detecting whether any of said M-bit words contain an error by failing to satisfy the mapping function during said step of reconverting; and determining that each data unit that includes an M-bit word having an error is erroneous.

2. A method according to claim 1; in which the number of bits in each N-bit word is greater than the number of bits in each M-bit word.

3. A method according to claim 2; in which the number of bits in each N-bit word is equal to 10 and the number of bits in each M-bit word is equal to 8.

4. A method according to claim 1; further comprising the step of determining whether each erroneous data unit is capable of being corrected, based on the number of M-bit words containing an error in each data unit.

5. A method according to claim 4; further comprising the step of concealing each erroneous data unit that is determined to be uncorrectable by substituting another data unit therefor.

6. A method according to claim 5; in which said digital signal is a digital video signal comprised of successive field intervals, each field interval having a plurality of data units, and each said another data unit is substituted from the field interval next previous to the respective field interval including the erroneous data unit to be concealed.

7. A method according to claim 4; in which at least one error correcting word is added to said reconverted digital signal every predetermined number of M-bit words, and further comprising the step of correcting errors in said M-bit words by means of said at least one error correcting word.

8. A method according to claim 7; in which two error correcting words are added to each predetermined number of data units of M-bit words, and said step of correcting corrects the error in each M-bit word by means of at least one of the error correcting words associated with the data unit to which the erroneous word belongs.

9. A method of processing a digital signal comprising the steps of:

sampling an analog signal at a predetermined frequency;

converting the sampled signal into digitized form;

forming a data block for every predetermined number of bits of said digital signal;

adding an identification signal to each data block for identification thereof; and adding an error correcting signal to each of said identification signals.

10. A method according to claim 9; further comprising the steps of detecting whether each said identification signal includes an error, and correcting any error detected in each identification signal by means of the respective error correcting signal added thereto.

11. A method according to claim 10; in which said digital signal is a digital color video signal having a luminance component and a chrominance component with a color sub-carrier, further comprising the steps of dividing each data block into a plurality of data units, adding the identification signal from each data block to each of the data units included therein, detecting whether any errors exist in each data unit, determining whether errors detected in each data unit are capable of being corrected, concealing errors in each data unit that are determined to be uncorrectable by substituting an associated data unit therefor, said associated data unit having an identification signal from its corresponding data block added thereto, comparing the identification signal from each concealed and unconcealed data unit with a reference identification signal, and inverting the phase of the color sub-carrier in a data unit when its added identification signal does not satisfy a predetermined compared relation with respect to said reference identification signal.

12. A method of processing a digital signal comprising the steps of:

sampling an analog signal at a predetermined frequency;

converting said sampled signal into digitized form;

forming a data word every m bits; and adding two check words P and Q to every n data words, each check word having m bits and said check words being formed by the equations:

$$\begin{cases} Q = T^{-1}W_n + T^{-2}W_{n-1} + \ldots + T^{-(n-1)}W_2 + T^{-n}W_1 \\ P = T^1 W_n + T^2 W_{n-1} + \ldots + T^{n-1}W_2 + T^n W_1 \end{cases}$$

where $T^{-1}, T^{-2}, -T^{-(n-1)}, T^{-n}, T^1, T^2, -, T^{n-1}, T^n$ are distinct, non-zero elements of a Galois field $(2^m)$.

13. Apparatus for processing a digital signal comprised of a plurality of N-bit words which have been code converted from a plurality of M-bit words in accordance with a predetermined mapping function, comprising:

reconverting means for reconverting each of said N-bit words to a respective one of said M-bit words in accordance with said mapping function, with said plurality of reconverted M-bit words forming a data unit for every predetermined number of words thereof;

first detecting means for detecting whether any of said M-bit words contain an error by failing to satisfy the mapping function when reconverted by said reconverting means; and first judging means for determining that each data unit that includes an M-bit word having an error is erroneous.

14. Apparatus according to claim 13; in which the number of bits in each N-bit word is greater than the number of bits in each M-bit word.

15. Apparatus according to claim 14; in which the number of bits in each N-bit word is equal to 10 and the number of bits in each M-bit is equal to 8.

16. Apparatus according to claim 13; further comprising second judging means for determining whether each erroneous data unit is capable of being corrected, based on the number of M-bit words containing an error in each data unit.

17. Apparatus according to claim 16; further comprising concealing means for concealing each erroneous data unit that is determined to be uncorrectable by substituting another data unit therefor.

18. Apparatus according to claim 17; in which said digital signal is a digital video signal comprised of successive field intervals, each field interval having a plurality of data units, and each said another data unit is substituted from the field interval next previous to the respective field interval including the erroneous data unit to be concealed.

19. Apparatus according to claim 16; in which at least one error correcting word is added to said reconverted digital signal every predetermined number of M-bit words, and further comprising correcting means for correcting errors in said M-bit words by means of said at least one error correcting word.

20. Apparatus according to claim 19; in which two error correcting words are added to each predetermined number of data units of M-bit words, and said correcting means corrects the error in each M-bit word by means of at least one of the error correcting words associated with the data unit to which the erroneous word belongs.

21. Apparatus for processing a digital signal, comprising:
sampling means for sampling an analog signal at a predetermined frequency;
converting means for converting the sampled signal into digitized form;
forming means for forming a data block for every predetermined number of bits of said digital signal;
first adding means for adding an identification signal to each data block for identification thereof; and
second adding means for adding an error correcting signal to each of said identification signals.

22. Apparatus according to claim 21; further comprising receiving means for receiving the digital signal having said identification and correcting signals added thereto, said receiving means including detecting means for detecting whether each said identification signal includes an error, and correcting means for correcting any error detected in each identification signal by means of the respective error correcting signal added thereto.

23. Apparatus according to claim 22; in which said digital signal is a digital color video signal having a luminance component and a chrominance component with a color sub-carrier, said receiving means further including dividing means for dividing each data block into a plurality of data units, third adding means for adding the identification signal from each data block to each of the data units included therein, second detecting means for detecting whether any errors exist in each data unit, judging means for determining whether errors detected in each data unit are capable of being corrected, concealing means for concealing errors in each data unit that are determined to be uncorrectable by substituting an associated data unit therefor, said associated data unit having an identification signal from its corresponding data block added thereto, comparing means for comparing the identification signal from each concealed and unconcealed data unit with a reference identification signal, and phase inverting means for inverting the phase of the color sub-carrier in a data unit when its added identification signal does not satisfy a predetermined compared relation with respect to said reference identification signal.

24. Apparatus for processing a digital signal, comprising:
sampling means for sampling an analog signal at a predetermined frequency;
converting means for converting said sampled signal into digitized form;
forming means for forming a data word every m bits; and
adding means for adding two check words P and Q to every n data words, each check word having m bits and said check words being formed by the equations:

$$\begin{cases} Q = T^{-1}W_n + T^{-2}W_{n-1} + \ldots + T^{-(n-1)}W_2 + T^{-n}W_1 \\ P = T^1W_n + T^2W_{n-1} + \ldots + T^{n-1}W_2 + T^nW_1 \end{cases}$$

where $T^{-1}, T^{-2}, -T^{-(n-1)}, T^{-n}, T^1, T^2, -, T^{n-1}, T^n$ are distinct, non-zero elements of a Galois field $(2^m)$.

25. Apparatus according to claim 24; further comprising first and second check word generating means for generating said two check words P and Q as a function of predetermined first and second generator polynomials, respectively.

26. Apparatus according to claim 25; in which each of said first and second check word generating means includes first latch means serially receiving said data words and producing an output, second latch means producing an output, and operational means for operating on the outputs of said first and second latch means in accordance with the respective one of said first and second generator polynomials and for supplying an output to said second latch means.

27. Apparatus according to claim 24; further comprising receiving means for receiving said digital signal having said check words P and Q added thereto, said receiving means including detecting means for detecting any errors in said received data words, and correcting means for correcting at least some errors detected in said received data words.

28. Apparatus according to claim 27; in which said correcting means includes first syndrome generator means for generating a first syndrome in response to each first check word P and its associated n data words, second syndrome generator means for generating a second syndrome in response to each second check word Q and its associated n data words, first syndrome operating means for operating on said first syndrome in accordance with a predetermined function and for producing an output in response thereto, second syndrome operating means for operating on said second syndrome in accordance with a predetermined function and for producing an output in response thereto, comparator means for comparing the outputs of said first and second syndrome operating means to detect whether an error is present in each data word and for producing an output in response thereto, and an error correcting circuit for correcting errors in said data words when said comparator means indicates that an error is present in a data word.

29. Apparatus according to claim 28; in which said correcting means further includes comparator control means for determining whether every n data words contain at least one error and whether each said at least one error is capable of being corrected and for inhibiting the operation of said comparator means when it is determined that no errors are present in a group of n data words or when it is determined that said at least one error in a group of n data words is not capable of being corrected.

30. Apparatus according to claim 29; in which said correcting means further includes memory means for storing each n data words, and multiplexer means for selecting as an output the output of said memory means or the output of said error correcting circuit in response to said comparator means so that the output of said memory means is selected when no errors are present in a group of n data words or when at least one error is present in a group of n data words and is determined to be not capable of correction, and the output of said error correcting means is selected when at least one error is present in a group of n data words and is determined to be capable of correction.

31. Apparatus according to claim 29; further including counter means for counting the number of errors present in each group of n data words and for producing a counted output in response thereto, and said comparator control means includes first syndrome comparator means for detecting whether the output of said first syndrome operating means is a logic level "0" signal and for producing an output in response thereto, second syndrome comparator means for detecting whether the output of said second syndrome operating means is a logic level "0" signal and for producing an output in response thereto, and gate means for producing a comparator inhibit signal in response to the outputs of said first and second syndrome comparator means and said counted output for inhibiting the operation of said comparator means when no errors are present in a group of n data words or when at least one error in a group of n data words is not capable of being corrected.

* * * * *